United States Patent [19]

Sutherland et al.

[11] 4,333,074

[45] Jun. 1, 1982

[54] SECURITY SYSTEM

[75] Inventors: Hugh E. Sutherland, London; Philip J. Spiegelhalter, East Barnet; Martin R. Spiegelhalter, Horam; Brian H. Goring, Southwater, all of England

[73] Assignee: Southwater Security Limited, West Sussex, England

[21] Appl. No.: 127,305

[22] Filed: Mar. 5, 1980

[30] Foreign Application Priority Data

Mar. 7, 1979 [GB] United Kingdom ................ 7908009

[51] Int. Cl.[3] ............................................. H04Q 3/00

[52] U.S. Cl. ................................ 340/825.3; 340/543; 340/825.36

[58] Field of Search .......................... 340/164 R, 543; 361/172

[56] References Cited

U.S. PATENT DOCUMENTS

| | | | |
|---|---|---|---|
| 3,633,167 | 1/1972 | Hedin | 340/164 |
| 3,878,511 | 4/1975 | Wagner | 340/147 MD |
| 3,881,171 | 4/1975 | Moorman | 340/164 R |
| 3,881,171 | 4/1975 | Moorman | 340/543 |
| 3,953,769 | 4/1976 | Sopko | 361/172 |
| 4,021,796 | 5/1977 | Fawcett | 340/164 R X |
| 4,095,239 | 6/1978 | Gerry | 340/147 MD |

*Primary Examiner*—Harold I. Pitts

*Attorney, Agent, or Firm*—Cushman, Darby & Cushman

[57] ABSTRACT

A security system in which a predetermined combination can be set by a operator to disable the system. An audible alarm is sounded when the entered combination differs from the correct combination by an error outside prescribed limits and a secondary alarm given when the error is within the limits.

6 Claims, 6 Drawing Figures

SECURITY SYSTEM

BACKGROUND OF THE INVENTION

The invention relates to a security system and in particular to a security system including a combination device in which a predetermined combination can be set by an operator to disable the system.

Many such systems are known (see for example U.S. Pat. Nos. 3,953,769, 4,021,796, 4,095,239, 3,633,167, 3,881,171, and 3,878,511) in which each authorised operator is required to remember a predetermined combination or key. To allow for human error, particularly such as might occur under duress during an ambush, it is common to provide for the detection of errors and to permit a limited number of errors prior to disablement of the system.

A more sophisticated solution is for the system to recognise in addition to the usual entry combination, a "duress" code which consists of a predetermined variant of the entry combination when the duress code is entered the system is apparently disabled to permit entry to the secure area but a mute or remote alarm of some kind is actuated to warn of an instrusion. It is an important disadvantage of such systems that the operator is required not only to remember two codes but also to remember the significance of each one. In the interests of operator safety, especially during an ambush, it is important that the intruders do not suspect that a duress code has been used.

In accordance with this invention, we propose a system of this kind in which an alarm circuit is arranged to detect when the set combination differs from the predetermined combination by an error which falls within prescribed limits and, in response to the detection of such an error, to disable the system primary alarm but to generate a secondary alarm, such as a mute or remote alarm.

The system may be a monitoring system including sensors for detecting when a door or window opens or when some other event occurs, so that an alarm is generated when the event occurs unless the correct combination is set; that is to say the system has a passive function.

In a preferred embodiment, however, the system has an active function and acts to perform some operation, such as the unlocking of door or the like.

In either embodiment, the combination is preferably an alpha/numeric word of say ten characters and is set in a keyboard interface unit for comparison by a logic circuit, with one or more stored combinations which are known only to authorised personnel. In this case, a suitable error is 10% this corresponding to a one character error which can be detected by the logic circuit.

Various forms of memory unit have been considered, together with their associated control circuitry. One major consideration was that most memory units require continuous power to retain stored data, and would be reset to zero by a power failure. This risks an intruder being able to gain entry by making the power fail for a short time, but could be avoided by arranging the logic circuit to prohibit the same combination in (any two) memory units. A greater problem associated with memories of this type is reprogramming, which requires complicated control circuits. One memory unit which would avoid power failure problems is a ROM (Read Only Memory) programmed either by fusible internal links, or Ultra-Violet Erasable ROM's, in which the memory is reprogrammed after about 30 minutes exposure to Ultra-Violet. These would require plug-in modules and specialist programming.

Alternative memories include, e.g. Magnetic Tape/-disc but these involve excessive power consumption, are mechanically prone to damage, and are bulky, and reprogramming difficulties also exist.

All the above systems could be used with a microprocessor as controller, but these require operating instructions stored, for example, in ROM's. It is preferred, therefore, to use a hard-wired and therefore unreprogrammable control system together with a DIODE MATRIX memory using repeatable numbers to provide a large number of available combinations. This memory, located within the main unit, is programmed by inserting the diode-pins in an array of holes to represent the desired ten character combination.

BRIEF DESCRIPTION OF THE DRAWINGS

A preferred embodiment of security system according to this invention for controlling access through a door by means of an electronic combination lock, will now be described by way of example with reference to the accompanying drawings of which.

DETAILED DESCRIPTION OF THE PREFERRED EMBODIMENT

Figure 1:
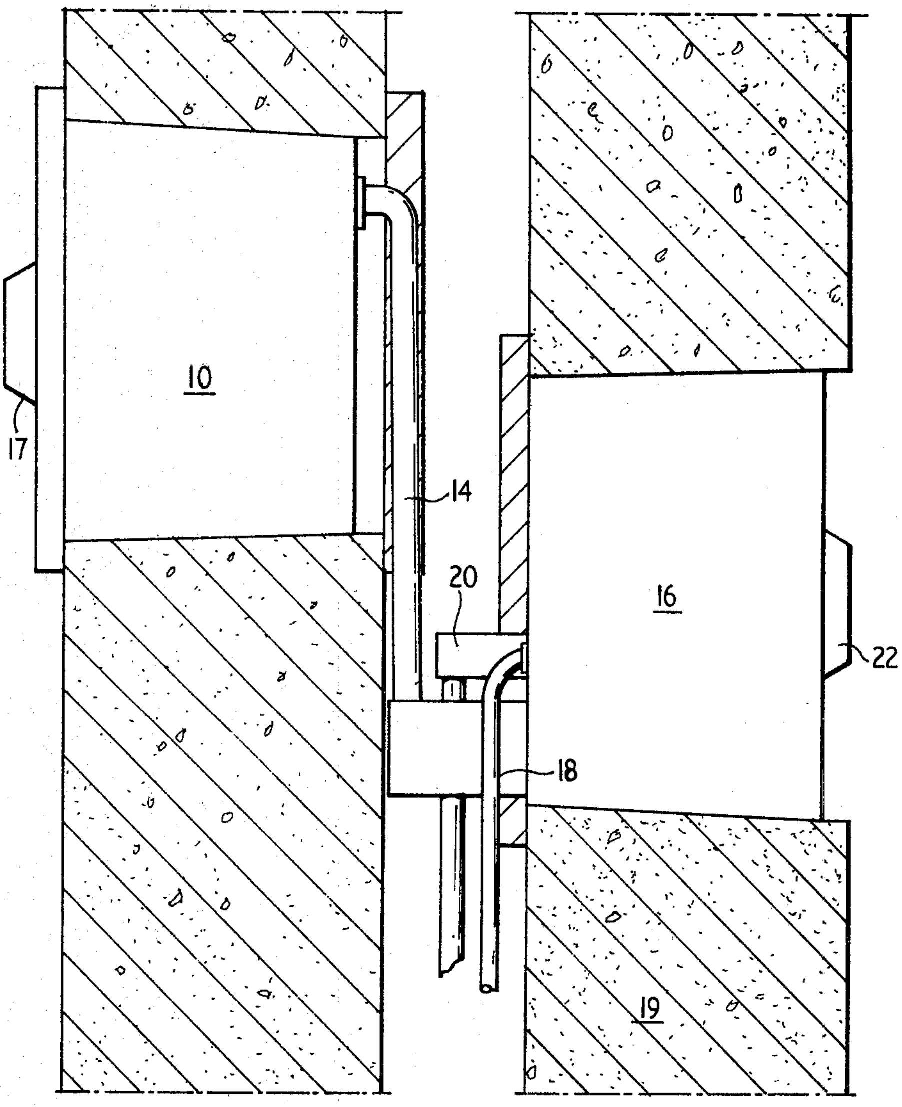
FIG. 1 is a cross-section through the wall of a building adjacent the door and showing an "entry" unit and a "master" unit forming part of the security system, in the figures the units are shown near to each other for the purpose of illustration only.
Figure 2:
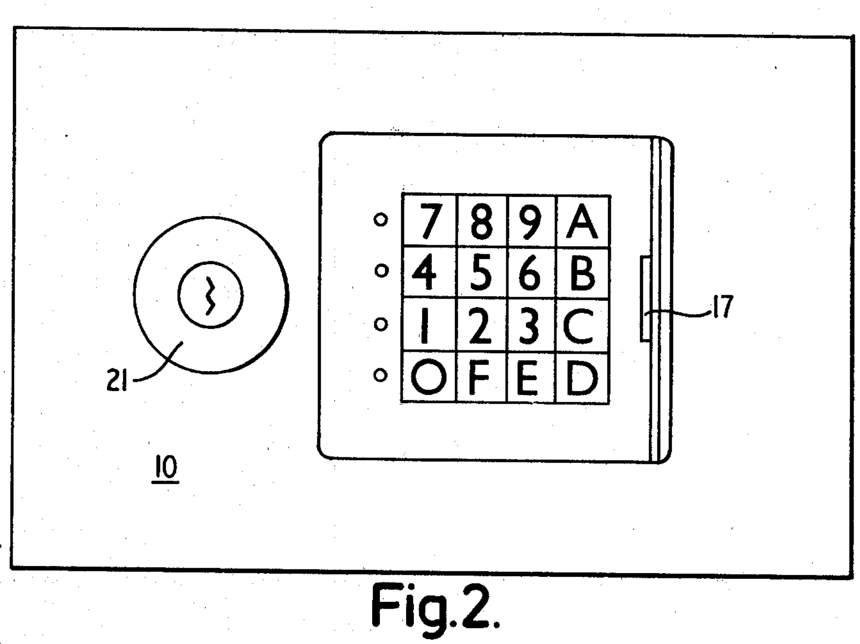
FIG. 2 is a view of the "entry" unit panel which is accessible to an operator outside the building.
Figure 3:
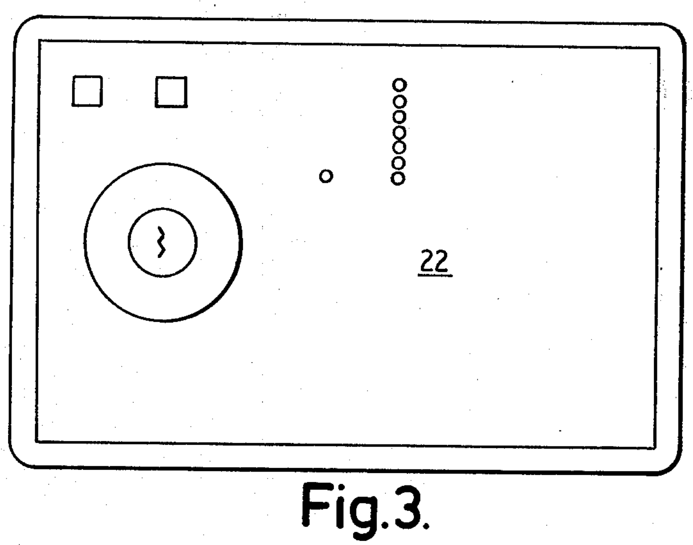
FIG. 3 is a view of the master unit panel.
Figure 4:
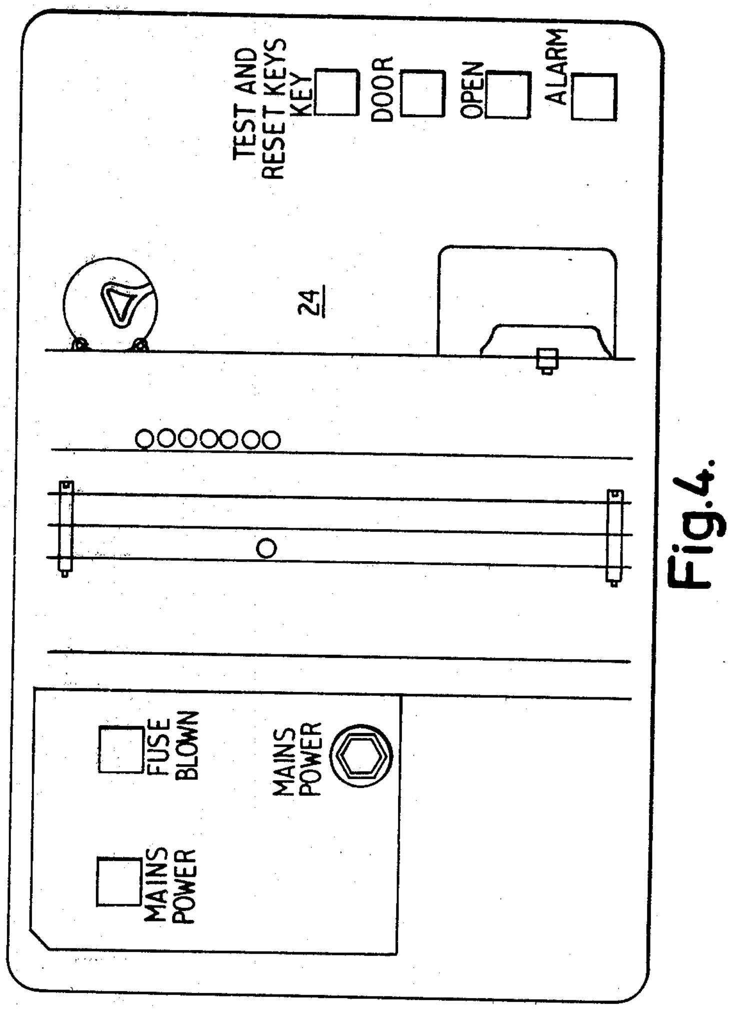
FIG. 4 is a view of the master unit as shown in FIG. 3 but with the front cover removed.

As will be seen from the figures, the security system comprises one or more entry units 10 (one shown) each mounted in the outer course of the wall of a building adjacent a door or window or the like (or any position external to the secured area), and connected by a multicore cable 14 which, in the preferred embodiment, has 36 cores, to a master unit 16 mounted in any convenient position such as for example, in the inner course 19 of the wall, but in any event within the secured area. The master unit 16 is connected to a power cable 18 and receives and transmits control signals along another multi-core cable 20. For added security, the master unit has a front cover 22 for a control panel 24 which can be locked by a conventional mechanical lock to prevent access by all but authorised personnel, the program boards within only being accessible by their valid non duress code.

To enter the building when the security system is in use, it is necessary to insert an acceptable, that is to say a predetermined combination, known only to authorised personnel, in the entry unit keyboard 26. This combination is recognised by a logic circuit in the master unit and in response thereto generates an output control signal causing energisation of a solenoid operated lock on the door.

A cover 17 for the keyboard 14 can be locked by a mechanical key-operated lock 21 so affording additional security and protection against vandals and reducing the risk of false alarms caused by playful children, etc. This also prevents would be intruders examining the keys to determine which are most commonly used.

Figure 5:
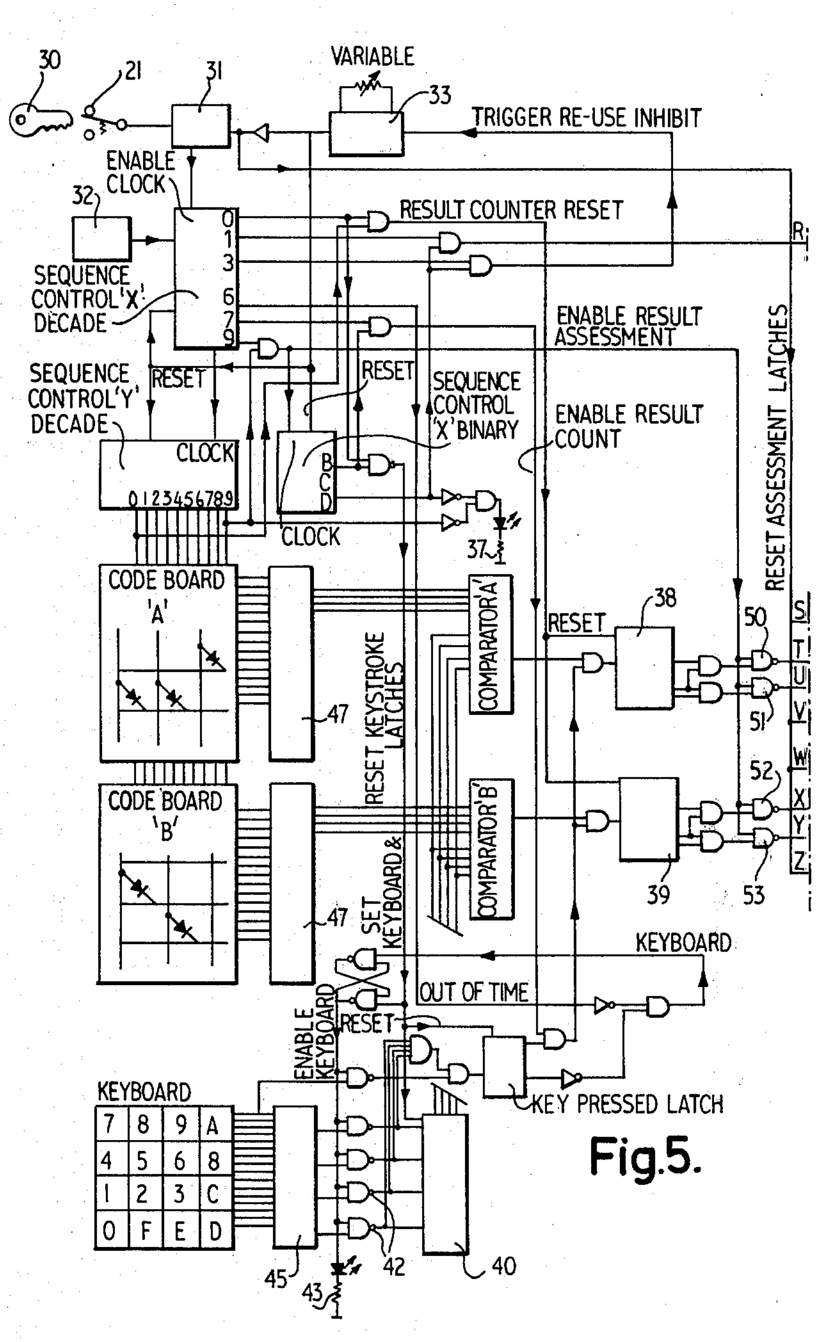
FIG. 5 is a circuit diagram of the preferred embodiment of security system.
Figure 5:
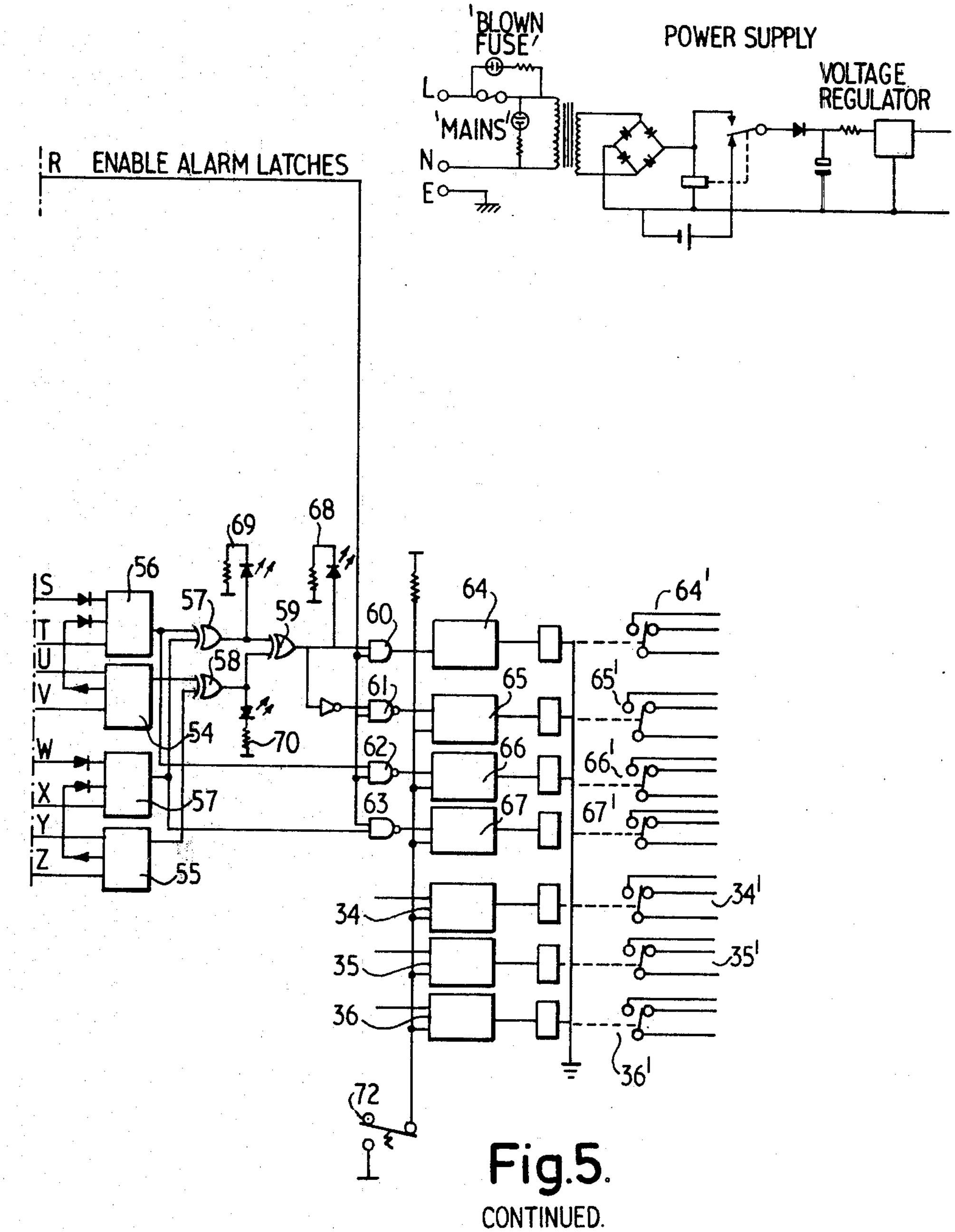

As will be described below in more detail with reference to FIG. 5, this embodiment of security system is arranged to open the door (or other access to the secured area), thus permitting authorised entry without an alarm, when one of two predetermined combinations is entered in the keyboard but will also permit authorised entry when the combination entered differs from either one of the two predetermined combinations by an acceptable error. In this case the predetermined combination comprises 10 characters, the acceptable error being 10% that is to say, authorised entry is permitted if only one character of the combination is incorrect. When such an error is detected, the system primary alarm is not sounded but a mute or remote alarm, for example at the local police station, is actuated. The intruder is therefore unaware that his entry to the building has been detected.

In addition to the primary alarm which is generally an audible alarm, and the mute or remote secondary alarm, there are indicator lights in the master unit 16 which indicate the state of the alarm circuit at any one time.

The two predetermined 10 character combination are set in memory units designated A and B (in FIG. 5), each comprising a hard wired and therefore unreprogrammable control circuit together with a diode matrix. These units which are removably mounted in the MASTER unit are programmed and can be reprogrammed by inserting or re-arranging diode-pins in a rectangular array of holes or sockets, the position in the 10 character combination determining the position of a pin along a row (from left to right) and the position of the pin in the vertical column determining the chosen character. A zero is set by not inserting a pin. If an entirely random ten character combination proves too long for some users to remember, the last characters may be repeated or set to zero.

To change the predetermined combination it is possible to remove the plug-in type memory board and either replace it by another or rearrange the diode pins, once access to its sub-panel has been gained by use of its own existing valid combination.

Insertion and or turning of the key 30 in the lock 21 and opening of the cover 16 may be detected by sensors, this serving to initiate the main control circuit by setting a latch 31 to enable the sequence timing controls driven by a system clock 32.

With no key in the lock and the cover 16 open, a buzzer will sound in the entry unit as a reminder to close the cover 16 after use. This may also act as a deterrent to vandals who have opened the door by force. If the buzzer continues to sound for several seconds, the control circuit will set one of three TAMPER alarm latches 34, 35, 36 to operate the associated output relay 34' hence sounding the primary (i.e. audible local) alarm and, if desired, also the secondary mute or remote, alarm. The associated indicator 2 on the Master unit is also lit. Repeated initiation of the control circuit is prevented after triggering a monostable device 33 to inhibit the latch 31, for a preset time following the first operation of the key.

With the circuit initiated as described above, a light emitting diode 37 beside the entry unit keyboard, is switched on, to indicate that the user should wait before taking further action thus affording ample time to redirect his attention after turning the key and opening the door. The result Counters 38 and 39 are also reset at this point.

Shortly before the operator is required to begin entering the combination known to him the WAIT indicator 37 is turned-off, keystroke latches 40 are reset and NAND gates 42 at output from the keyboard 26 are enabled. This also switches on another light emitting diode 43 known as a timing light on the entry unit panel to indicate that a key should be depressed. The light 43 turns on until the key is pressed or for a period of say 0.6 seconds, whichever is the earlier. Unless the key is pressed during the allotted time an error may result.

The result of each keystroke is passed through a BCD converter 45, stored and passed to both comparator A and B in each of which the character is compared with the corresponding character of the combination stored in the respective memory units A and B, this being read out of the memory unit via a BCD convertor 47. When a correct character is detected the comparator A or B produces an output signal to step-on, a result counter 48 or 49 associated therewith. Alternatively, the result counter may be stepped-on in response to an incorrect character, so directly indicating the number or percentage error. The keyboard is inhibited until the end of the allotted time period but is then enabled and the keystroke latches 40 reset. The sequence control also steps-on scanning of the memory units A and B, to the next character in the combination.

After the complete cycle (typically 10 seconds) the NAND gates 50, 51, 52, 53, are enabled to assess the result of the comparison.

If either of the result counters 38 and 39 indicate a completely correct combination the associated 100% latch 54 or 55 is set. Similarly, if there is a single character error, the associated 90% latches 56 and 57 are set. The condition of these latches is detected by an arrangement of exclusive OR gates 57, 58 and 59 and further NAND gates 60, 61, 62, and 63 to derive logic signals for setting the appropriate door openable timer 64 and alarm latches 65, 66, and 67 controlling output relays 64', 65', 66' and 67'.

Light emitting diodes 68, 69 and 70 indicate on the Master unit 16 panel whether the door is opened and whether this is as a result of a 90% or a 100% accurate combination. The door opening latch 64 is set to close the associated output relay and energise the solenoid operated door lock, 20 seconds after the LED 70 is turned on, this delay allowing time to close the cover 16 and remove the key. The opening sequence can be arrested by infra red beams being broken in the case of unauthorised people approaching too close to the access point (i.e. the area of some entry units would be inside a beam fence enabled when the unit is opened). In the event of 90% accurate combination LED 68 lights, the door opens after 20 seconds and the alarm latch 66 or 67 is set to actuate mute or remote alarms.

A less accurate combination results in setting of the latch 65 to produce an audible alarm.

During the 20 second delay, there is a second keyboard entry cycle to permit correction of a genuine mistake by an authorised person but after this second cycle there is no further delay so that the appropriate alarm will sound unless a 100% combination has been entered. No wrong attempt is ignored.

Following an alarm, the system must be reset manually by a reset control 72 in the master unit 16.

In the foregoing description all time limits given are by way of example and may be, indeed preferably are adjustable. The door opening period of 20 seconds may need to be extended depending for example upon the distance between the entry unit and the door (made a safe period by beam trips or pressure mats).

Also in the foregoing, entry of the combination is by way of the multi-digit keyboard 26, but it will be understood that any suitable interface unit may be used. We envisage, for example, the use of a single digit randomly generated display and digit entry key or keys which may be similar to the arrangement described in U.S. Patent specification No. 3,881,171, but which is preferably adapted to respond to different applied pressure. A first pressure causing the display to advance and a different, heavier pressure causing entry of the digit displayed at that time. Alternatively, entry could be effected by means of a second key immediately adjacent an advance or stepping key. This arrangement does not require an operator to remove his hand so exposing the display to an observer. Also the mere application of a different pressure is unlikely to be detected so that even if the display is visible, an observer would remain ignorant of the set combination.

The alarm relays (or MEMSTORE S) will be in accordance with the characteristics of the unit to be operated.

Alarm signals or any other unit operated by this device use a tone or sequence signal whose presence/or absence is noted, and are not driven/initiated by a straight line voltage to turn off/on.

A PLL (Phone Locked Loop IC) (as in FM Radio) can be used to compare the Phase of 2 signals through parallel wires. This is to detect wire cutting when unauthorised personnel use jump leads either side of a site to be wire cut.

We claim:

1. A security system including a combination device in which one or more predetermined combinations can be set by an operator to disable a system primary alarm, and comprising a logic circuit adapted to detect when the set combination differs from this or one of the predetermined combinations by an error which falls within prescribed limits, and in response to the detection of such an error, to disable the system primary alarm but to generate a secondary alarm.

2. A system according to claim 1 and wherein the logic circuit including a store for each predetermined combination and a comparator associated with the said store for comparing the set combinations with the combination stored therein.

3. A system according to claim 2 where the said store is a programmable diode matrix memory.

4. A system according to claim 2 or claim 3 wherein the comparator is adapted to produce an output for each correct character in the combination and is connected to a results counter stepped by the said output to indicate the number of correct characters in the set combination logic circuit being adapted, in response to the setting of the results counter, to generate or disable the primary alarm as the case may be, or should the results counter indicate an error in the set combination which lies within the said prescribed limits to disable the primary alarm but generate the secondary alarm.

5. A system according to any one of claims 1 to 4 wherein the combination device comprises a keyboard entry or other interface unit and a control circuit incorporating the said logic circuit, and wherein the interface unit is normally concealed behind a cover secured by a lock, the lock having sensors for detecting operation of the lock and producing an output in response thereto, to enable the control circuit.

6. A security system comprising an electronic combination lock and a control circuit including a keyboard entry or other interface unit accessible to an operator for setting a combination, a store for each of one or more predetermined combination, a comparator associated with the store and connected to the interface unit for comparing each character of the set combination with corresponding character of the stored predetermined combination, to produce an output indicating when a character in the set combination is correct or incorrect, a results counter stepped by the comparator output to indicate the number of correct or incorrect characters in the set combination, and a logic circuit adapted, in response to the setting of the results counter, or counters to disable the system primary alarm when the set combination is correct and to disable the system primary alarm but generate a secondary alarm when the set combination differs from any one of the one or more predetermined combinations by an error which falls within prescribed limits.

* * * * *